(No Model.)

T. H. STACKHOUSE.
TYPE WRITING MACHINE.

No. 587,020. Patented July 27, 1897.

5 Sheets—Sheet 1.

WITNESSES:
Jos. Horn
H. Loss

INVENTOR
Thomas H. Stackhouse
by his attorney
Chas. A. Rutter (No Model.) 5 Sheets—Sheet 2.

T. H. STACKHOUSE.
TYPE WRITING MACHINE.

No. 587,020. Patented July 27, 1897.

WITNESSES:
Jos. Horn
H. V. Loss

INVENTOR
Thomas H. Stackhouse
by his attorney
Chas. A. Rutter

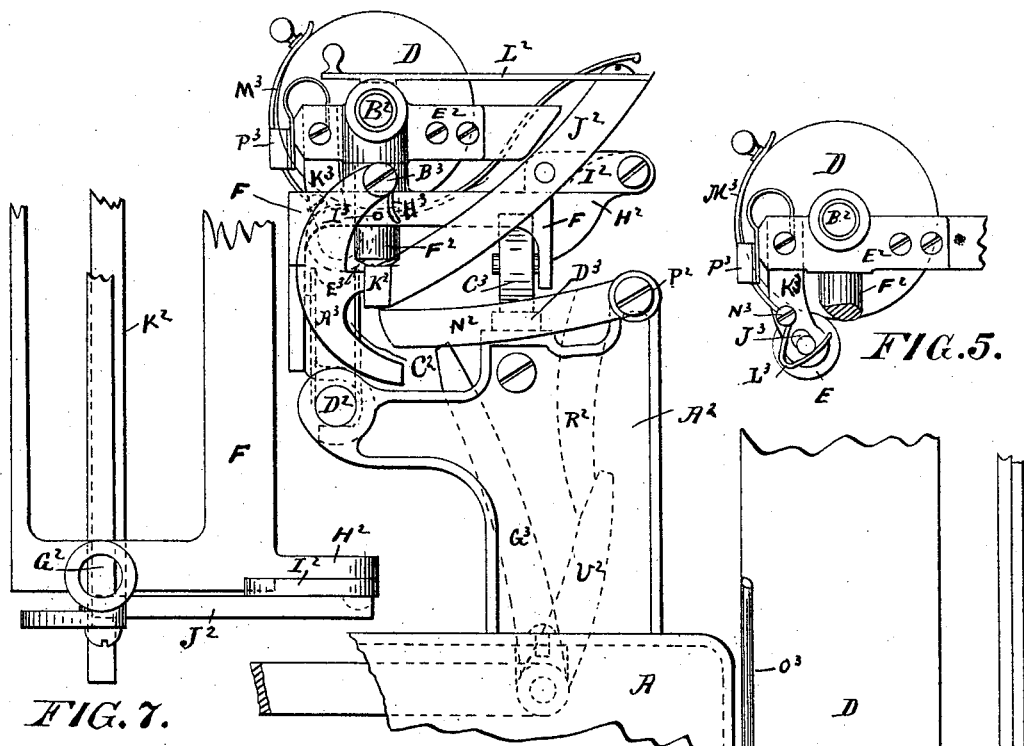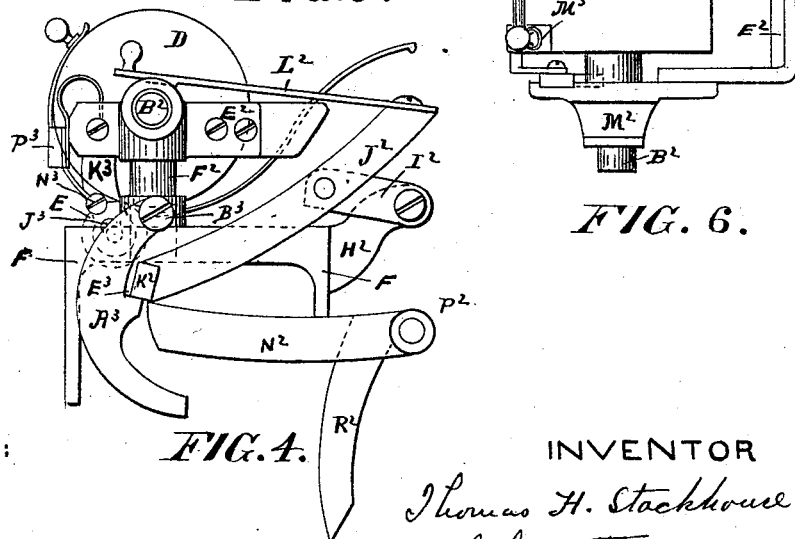

(No Model.) 5 Sheets—Sheet 4.
T. H. STACKHOUSE.
TYPE WRITING MACHINE.
No. 587,020. Patented July 27, 1897.
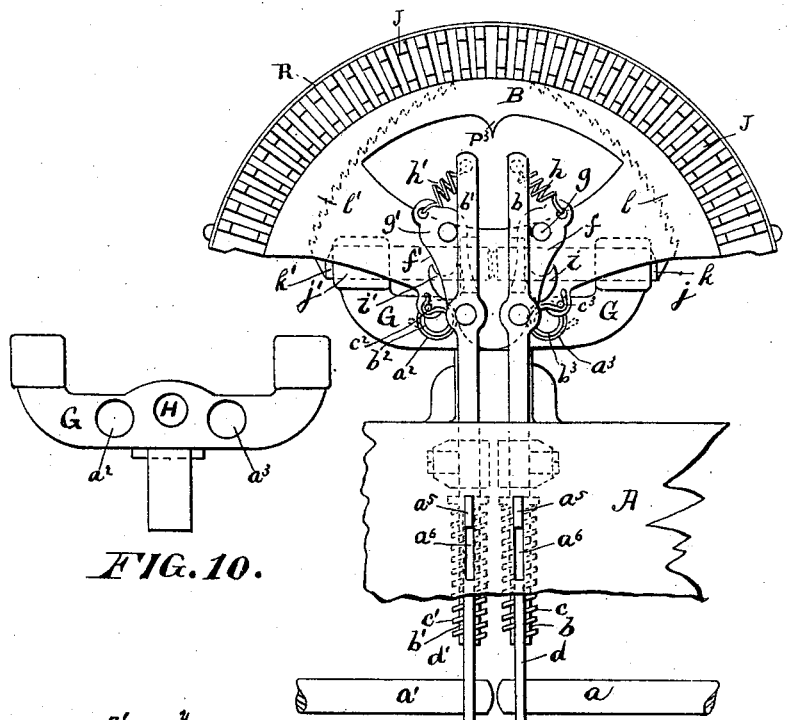
FIG. 10.
FIG. 11.
FIG. 12.
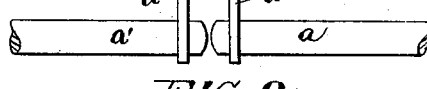
FIG. 8.
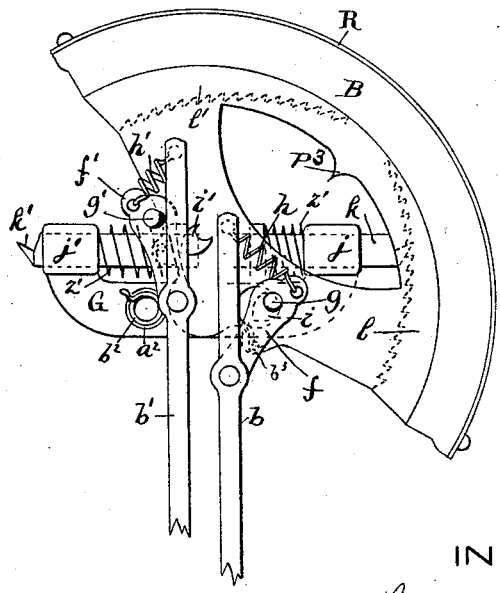
FIG. 9.
WITNESSES:
Jos. Horn
W. Loss
INVENTOR
Thomas H. Stackhouse
by his attorney
Chas. A. Rutter.

(No Model) 5 Sheets—Sheet 5.

T. H. STACKHOUSE.
TYPE WRITING MACHINE.

No. 587,020. Patented July 27, 1897.

WITNESSES:
Jos. Horn
H. Loss

INVENTOR
Thomas H. Stackhouse
by his attorney
Chas. A. Rutter.

THE NORRIS PETERS CO., PHOTO-LITHO., WASHINGTON, D. C.

UNITED STATES PATENT OFFICE.

THOMAS H. STACKHOUSE, OF PHILADELPHIA, PENNSYLVANIA, ASSIGNOR TO THE WYCKOFF, SEAMANS & BENEDICT, OF NEW YORK.

TYPE-WRITING MACHINE.

SPECIFICATION forming part of Letters Patent No. 587,020, dated July 27, 1897.

Application filed August 21, 1893. Serial No. 483,609. (No model.)

*To all whom it may concern:*

Be it known that I, THOMAS H. STACKHOUSE, a citizen of the United States, and a resident of the city and county of Philadelphia, State of Pennsylvania, have invented certain new and useful Improvements in Type-Writing Machines, of which the following is a specification.

My invention relates to improvements in type-writing machines; and the object of my invention is to furnish a type-writing machine which will be small and compact in size, simple and inexpensive in construction, the writing of which will be visible while the machine is in operation, which will combine with the quick sharp blow of the type-bar machine the interchangeable type of the type-wheel machine, and the type of which may be separately removed from the type-wheel whenever desired.

My type-writing machine is adapted for any class of work, but is particularly designed for manifolding and for cutting stencils upon prepared paper for use in reduplicating-machines.

Figure 1:
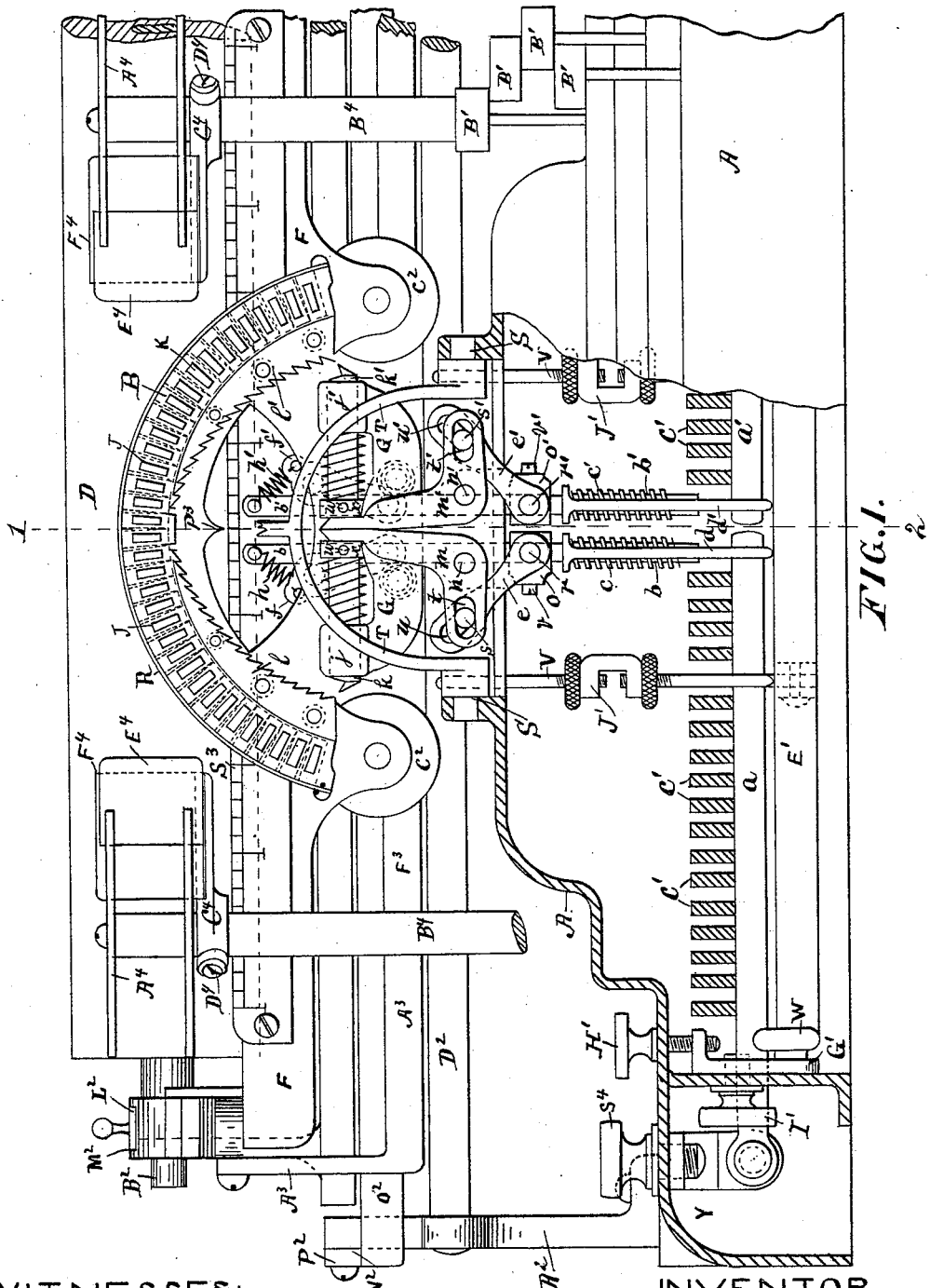
Figure 2:
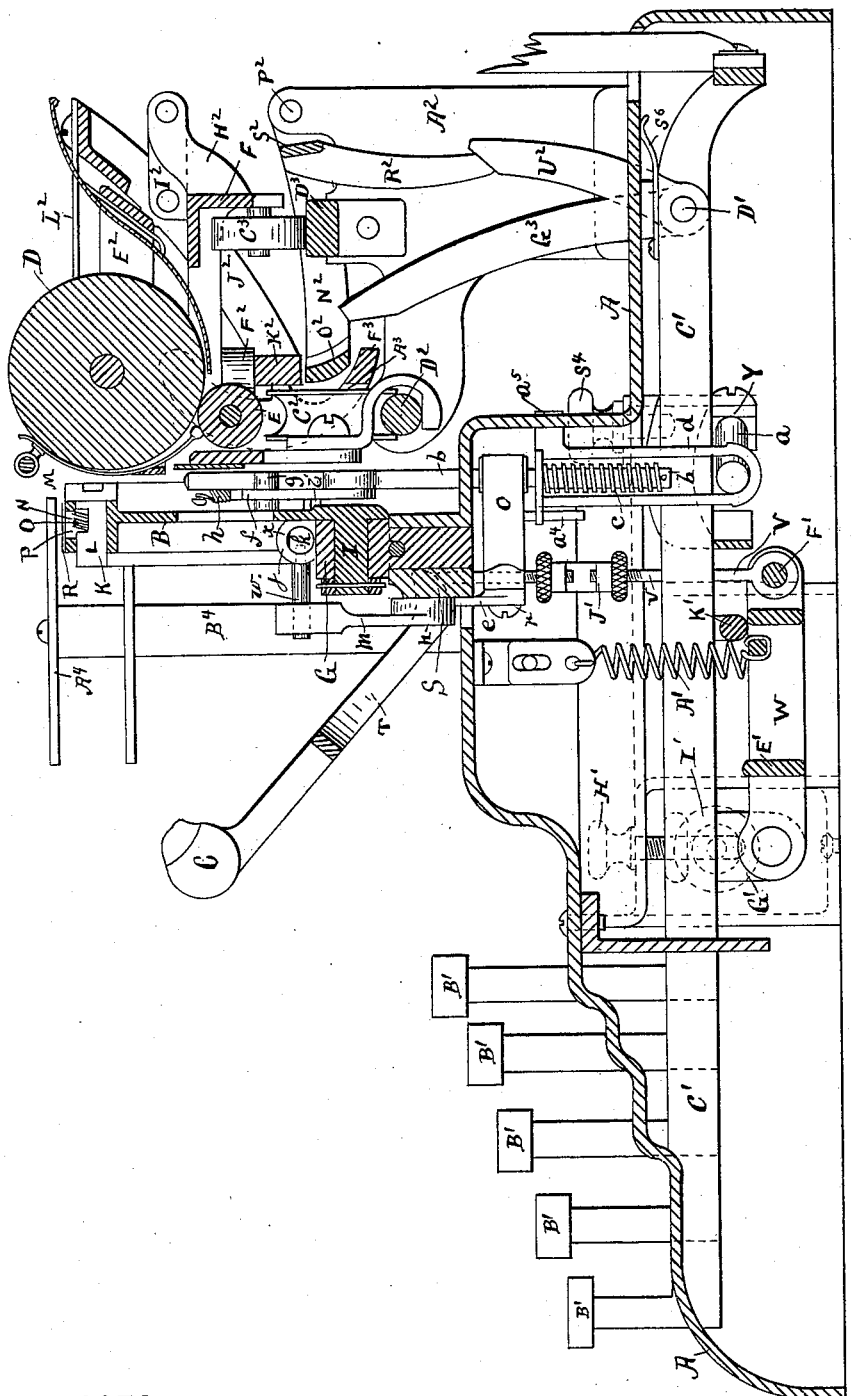
Figure 17:
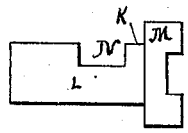
Figure 19:
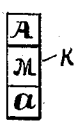
Figure 18:
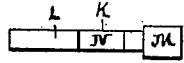
Figure 13:
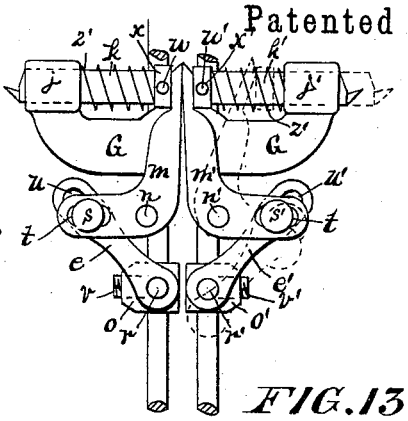
Figure 14:
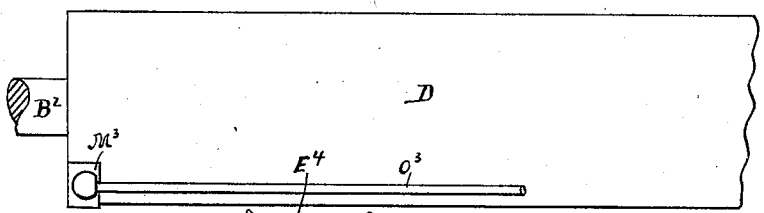
Figure 15:
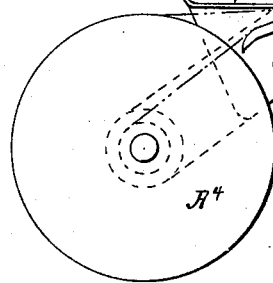

In the accompanying drawings, forming part of this specification and in which similar letters of reference indicate similar parts throughout the several views, Figure 1 is a front elevation, partly in section, of my type-writing machine; Fig. 2, a section of Fig. 1 on line 1 2; Fig. 3, an end elevation of the rear part of the machine, showing the carriage, platen, and their connected parts, the platen being in its normal or lowest position; Fig. 4, an end elevation of the carriage, platen, and levers for operating the platen, the latter being in its raised position; Fig. 5, an end elevation of the platen, paper-roll, and the frame and hanger which carry them; Fig. 6, a top view or plan of part of the platen and the frame in which it is journaled; Fig. 7, a plan of part of the carriage, part of the platen-elevating frame, and part of the latch for holding the platen in its elevated position; Fig. 8, a rear elevation of the type-wheel, the levers for operating the same, and the dogs or catches for holding the wheel after it has been swung upon its center to bring any desired type into position to be struck by the hammer; Fig. 9, a rear elevation of the type-wheel and part of its operating-levers, &c., showing positions when the wheel is swung over; Fig. 10, a rear elevation of the dog-carrying frame; Fig. 11, a side elevation of one of the dogs; Fig. 12, a section of Fig. 11 on line 3 4; Fig. 13, a front elevation of the dog-carrying frame, the dogs, and the levers for operating the same; Fig. 14, a plan of part of the platen and one of the ink-ribbon-carrying spools, showing the device for guiding the ink-ribbon when it leaves the spool; Fig. 15, a side elevation of the hammer and part of its operating-rod, and Fig. 16 a front elevation of the same; Figs. 17, 18, and 19, an enlarged side, top, and end elevation of one of the type-bolts, and Fig. 20 a plan of one of the bars $a'$ and part of the frame A, showing means for moving the outer end of these rods in or out, so as to increase or decrease the throw of the type-wheel.

A is the frame of the machine; B, the type-wheel; C, the hammer; D, the platen; E, the paper-roll; F, the carriage; G, a frame which is carried by the frame A and which is furnished with a hole or bearing H, Fig. 10, through which a pin I, Fig. 2, which is secured to or forms part of the type-wheel, passes. The pin I and the type-wheel B revolve around this bearing as a center.

The rim of the type-wheel B is furnished with a number of slots J, in which the type-bolts work. The type are upon the front end of a bolt K, an enlarged side, top, and end elevation of which are shown in Figs. 17, 18, and 19. The bolt K is preferably formed of one piece of metal, which is furnished with a shank L, which is adapted to enter and work in the slots J in the rim of the type-wheel. The front end of the bolt is furnished with a head M, which carries the type. Each head M preferably carries two type, as shown, the small letter being preferably upon the lower part of the head and the corresponding large letter upon the upper part of the head, as shown most clearly in Fig. 19.

The shanks of the type are furnished with a notch N upon their upper side, which is adapted to receive a spring O, Fig. 2, one end of which is adapted to bear against the front end of the notch N and the other against the rear side of a groove or notch P, turned out or formed on the periphery of the type-wheel B, as shown in Fig. 2.

R is a cap or cover which is secured to wheel B by screws or otherwise and which closes the top of groove P and serves to hold the springs O and the type-bolts in place.

If it is desired to remove one or more of the type-bolts K, the cap R is first removed from the wheel B, the spring O removed, and the bolt withdrawn. A new bolt may now be put in place, the spring replaced, and the cover secured, when the type-wheel is ready for use again.

The spring O operates to return the bolt K to its first position—that is, to keep its head M against the front face of the type-wheel B, as shown in Fig. 2, after it has been struck by the hammer.

The hammer C is pivoted to the frame A of the machine at S, as shown in Figs. 1 and 2.

In the drawings the hammer is shown with a bifurcated shank T, each end of which is pivoted to the frame, and I consider this construction the best, although in some cases the shank of the hammer may be pivoted to the frame in but one place.

Figure 16:
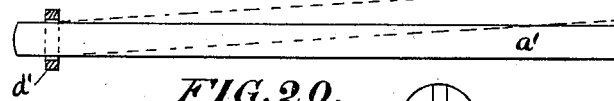

The lower end of the shank of the hammer is bent over, forming a crank U, as indicated in Figs. 15 and 16, to which is connected one end of a rod V, the lower end of which is connected to the outer end of a lever W, Figs. 1 and 2, the inner end of which is pivoted to a bracket G', adjustably secured to the frame A, as hereinafter described.

In Fig. 1 but little more than one-half of the machine is shown, owing to lack of space, but it will be understood that there is a lever W upon each side of the machine, both sides of which are symmetrical.

A', Fig. 2, is a spring one end of which is secured to the frame A and the other to the lever W and which returns this lever and its connected parts to their normal positions after they have been operated by the keys of the machine.

The type-wheel B, which carries the type, is preferably of the form of a segment of a circle, as shown, and is furnished with a pin or axle I, which is journaled to the frame of the machine or to a stationary frame G, carried by the frame A. This type-wheel and its axle are moved to the right or left to bring the several type to their printing or operative positions—in other words, directly to the center of the machine and opposite the hammer C. The mechanism for accomplishing this is as follows:

$a$ $a'$, Figs. 1, 2, and 8, are two rods, the outside ends of which are pivoted to a hanger Y, which is carried by the frame A, as hereinafter described. The inside ends of these rods are supported by hangers or straps $d$ $d'$, the upper ends of which are carried by springs $c$ $c'$, which surround and are carried by the lower ends of the rods $b$ $b'$, which extend vertically upward and are supported by links $e$ $e'$, Figs. 1, 2, and 13, as hereinafter described. Pivoted to the rods $b$ $b'$, near their upper ends, are links $f$ $f'$, which carry pins $g$ $g'$.

$h$ $h'$ are coil-springs, one end of which is secured to the upper ends of rods $b$ $b'$, as shown. Upon the back face of the type-wheel B are two pockets, lugs, or cups $i$ $i'$, Figs. 2, 8, and 9, the cup $i$ being adapted to be engaged by the pin $g$, carried by link $f$, when rod $b$ is lowered in order to cause the type-wheel B to be rocked upon its center or pivot I, to one side or the other, to bring the desired type to the center of the machine, so that it may be struck by the hammer C.

G is a frame which may form part of or which may be secured to the frame A of the machine. This frame G is furnished at its upper ends with bearings $j$ $j'$, which carry pawls or dogs $k$ $k'$, which are adapted to engage with the teeth of segmental racks $l$ $l'$, carried by the type-wheel B, in order to arrest the movement of this wheel and hold any predetermined type at the center or printing-point.

The pawls or dogs $k$ $k'$ are operated by means of bell-crank levers $m$ $m'$, Figs. 1, 2, and 13, which are pivoted to the frame A by means of pivots $n$ $n'$, and which are operated by the movements of the rods $b$ $b'$ through the arms $o$ $o'$ and the links $e$ $e'$, the arms $o$ $o'$ being secured to and moving with rods $b$ $b'$, and the links $e$ $e'$ being pivoted to the forward ends of these arms by pins or pivots $r$ $r'$ and to the horizontal arms of the bell-cranks $m$ $m'$ by pivots $s$ $s'$. The horizontal arms of the bell-cranks $m$ $m'$ are furnished with slots $t$ $t'$ and the upper ends of links $e$ $e'$ with slots $u$ $u'$.

The arms $o$ $o'$ are secured to rods $b$ $b'$ by means of screws $v$ $v'$. The throw of the bell-cranks may be varied by loosening the screws $s$ $s'$ and moving them in or out in the slots $t$ $t'$ in the horizontal arms of the bell-cranks.

The upper ends of the bell-cranks are adapted to engage pins $w$ $w'$, which are carried by collars $x$ $x'$, which are loosely placed upon the inner ends of the dogs $k$ $k'$.

$y$ $y'$ are slots or grooves in the dogs $k$ $k'$, into which the pins $w$ $w'$, carried by the collars $x$ $x'$, project.

$z$, Fig. 12, is a small coil-spring, one end of which bears against the outer end of slots $y$ $y'$, the other against the pins $w$ $w'$.

$z'$ are coil-springs surrounding the dogs $k$ $k'$, one end of which bears against the collars $x$ $x'$, the other against the bearings $j$ $j'$ on the frame G.

$a^2$ $a^3$, Figs. 8 and 10, are holes in the frame G; $b^2 b^3$, coil-springs placed in these holes. One end of these springs is secured to the frame G, the other being bent over, forming a hook, as shown in Fig. 8.

$c^2 c^3$ are pins carried by the type-wheel B, and which are adapted to engage the hooks on said coil-springs.

The operation of this part of the machine is as follows: One of the keys B' of the machine being struck, the lever C', to which it is attached, is depressed and lowers the free end of the rod $a$ or $a'$ with which it engages. (One half of the keys engage one of these rods, the other half the other rod.) As the keys have all the same stroke, the outer keys will cause a greater movement of the free ends of the rods than the inner ones, and hence the outer keys correspond with the type upon the outer ends of the type-wheel B, while the inner keys and levers correspond with the type toward the center of the wheel. Each of the levers C' is adapted to move down the free end of the rod $a\ a'$, with which it engages, a different distance. The rod $a$ draws down the hanger or strap $d$, which through spring $c$ draws down rod $b$ and link $f$, the pin $g$ on which engages the cup $i$ on the type-wheel B and draws this wheel over, as shown in Fig. 9, a distance which brings the type corresponding to the key struck to the center of the machine.

When the rod $b$ is drawn down, as described above, it draws down with it the arm $o$ and the link $e$. The upper end of link $e$ is furnished with a slot $u$, through which pin $s$, carried by bell-crank $m$, passes. The length of slot $u$ corresponds to the distance pin $g$, which is carried by link $f$, is from the cup $i$ on the rear face of the type-wheel B. At the same instant that pin $g$ engages cup $i$ and commences to move the type-wheel the upper end of slot $u$ in link $e$ engages pin $s$ on horizontal arm of bell-crank $m$, draws down this arm, and throws out the upper arm, which engages pin $w$, which is attached to collar $x$, and moves this collar out. The pin $w$ engages the coil-spring $z$, which it pushes forward and which pushes with it dog $k$, the tooth upon the end of which engages that one of the teeth of the segmental rack $l$ which corresponds to the type controlled by the particular key and lever operated.

The segmental racks are not concentric with the type-wheel, but are placed as shown in the drawings—that is, so that the lower teeth or those that correspond with the type near the center of the wheel, the ones that are most quickly brought to the center or printing-point, are very close to the tooth of the dog $k$, as shown in Fig. 8, requiring a very slight movement of the dog to engage them, while the teeth which correspond to the type upon the outer ends of the wheel—that is, the upper teeth—are farther away from the tooth of the dog, as shown in Fig. 9, the mechanism being so arranged that the greater the movement of the type-wheel to bring a given type to the printing-point the greater the throw of the dog $k$ in order to engage the rack $l$ and arrest the movement of the type-wheel. The dog $k$ engages the tooth corresponding to a given type at the same instant that the latter reaches the printing-point.

As the bell-crank $m$ will sometimes continue to move after the dog has engaged the ratchet and has been thereby brought to a stop, it is necessary that there be a yielding connection between the bell-crank and the dog. This may be accomplished in several ways. In the drawings I have shown the dog furnished with a slot $y$, in which is placed a coil-spring $z$ of small diameter, but of considerable length. One end of this spring bears against the outer end of slot $y$, the other against a part of the pin $w$, which passes through collar $x$. The spring $z$ is stiff enough to advance the dog as soon as the pin $w$ is moved by the bell-crank; but when the dog engages one of the teeth of rack $l$ and its movement is thereby arrested a further movement of the bell-crank will compress spring $z$ and allow the bell-crank to continue its movement.

The spring $z'$, which surrounds the dog, is compressed during the forward movement of the bell-crank, and when the bell-crank is returned to its first position this spring returns the collar $x$ and the dog to their first position.

The springs $h\ h'$, which are secured to upper ends of links $f\ f'$ and rods $b\ b'$, are for the purpose of returning these links to their first positions after the pins $g\ g'$ have left the cups $i\ i'$. These springs are prevented from drawing the links too far over by the projection of the base of the pins $g\ g'$ through them, as shown in Fig. 2, these projections being adapted to engage with the rods $b\ b'$, as most clearly shown in Fig. 8.

The type-wheel and its connected parts having been operated, as described, a further downward movement of the key B' causes the lever C' to strike the rib E', which connects the levers W, which are placed upon opposite sides of the machine. When this rib E' is struck by the lever C', it is depressed and carries down with it the free or forward ends of levers W and the rod or rods V, which are attached to these levers or to a rod F', Fig. 2, which is carried by them. The rod or rods V draw down the crank or arm U of the hammer and cause the shank of the hammer to turn in its bearings S and its head to fly in and strike the head of the type-carrying bolt a sharp quick blow. During this movement of the machine the rod $b$ and the type-wheel and its connected parts are held steadily by the dog $k$, engaging the rack $l$. These straps $d$ and the rod $a$ are moved down by the key-lever C', compressing spring $c$, which when the key is released asserts itself and returns strap $d$ to its first position. The rod $b$ is next released and rises, the spring $z'$ returns the dog $k$ and the bell-crank $m$ to their first positions, the pin $g$ is lifted from the cup $i$ on the type-wheel, and this latter is returned to its normal position by the uncoiling of the spring $b^2$, which operates against the pin $c^2$, carried by the type-wheel. It will be observed that when the type-wheel is rocked to one side one pin, as $c^2$, engages and coils up one spring $b^2$, while the other pin, $c^3$, is moved completely away from the other spring.

The strap $d$ is guided in its movements by means of a pin $a^4$, Fig. 2, which is carried by arm $o$, which is carried by rod $b$, which projects downward through a hole in the top of strap $d$, and by means of a lug $a^5$, Figs. 2 and 8, which projects backward from this strap and through a slot $a^6$, Fig. 8, in the frame A of the machine.

Figure 20:
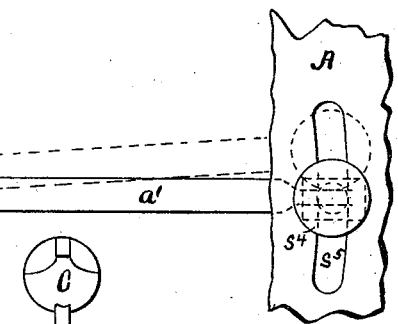

The outer ends of rods $a$ are pivotally connected to a hanger Y, which is supported by a screw $S^4$, which passes down through a slot $S^5$, Fig. 20, in the frame A of the machine. By loosening the screw $S^4$ the hanger Y and the outer ends of the rods $a$ $a'$ may be moved in or out, thus changing the relation of the type-levers $C'$ and the rods. The farther the rods are moved toward the front of the machine or away from the pivotal points of these levers the greater the distance the type-levers will depress them. The nearer they are moved toward the pivotal points of the levers the less they will be depressed, and hence by moving the outer ends of these rods in or out the throw of the type-levers may be adjusted.

The ends of the levers W are pivoted or journaled in brackets $G'$, Figs. 1 and 2, which are carried by screws $H'$ $I'$, carried by the frame A. By means of these screws, the operation of which will be evident from the drawings, the bracket $G'$ and the levers W may be raised or lowered so as to bring the rib $E'$, which connects the levers W, nearer to or farther away from the key-levers $C'$, and thus increase or decrease the length of stroke of the front ends of these levers and of the rod or rods V.

The rods V are made in two pieces, as shown, which are connected by a turnbuckle $J'$, by means of which the lengths of these rods may be adjusted to regulate the throw of the hammer G. The longer these rods the greater the throw of the hammer and the shorter the less the throw of the hammer.

$K'$, Fig. 2, is a stop carried by frame A, which prevents the spring $A'$ from lifting the levers W and their connected parts too far upward.

$P^3$, Figs. 1, 8, and 9, is a pointer which projects downward from the center of the inner or lower part of the rim of the type-wheel B and which indicates when the type-wheel is at rest at what division on the scale $S^3$ the next letter will be struck.

$A^2$, Figs. 1, 2, and 3, is a frame or standard carried by the rear part of the main frame of the machine, which carries the carriage and its connected parts. There is a frame $A^2$ upon each side of the rear part of the machine which are precisely similar in construction.

F is the carriage, which is supported upon wheels $C^2$ $C^3$, the former of which travels upon a rod or track $D^2$ and the latter upon a rod or track $D^3$, which are carried by the standards $A^2$.

D is the platen, which is furnished with a shaft $B^2$, which is carried in suitable bearings in a frame $E^2$, Figs. 2, 3, 4, 5, and 6.

$F^2$ are pins projecting downwardly from each end of the platen-frame $E^2$ and which are adapted to pass through holes $G^2$ in the ends of the carriage F. A plan of one end of the carriage, showing one of these holes, is shown in Fig. 7.

$H^2$, Figs. 2, 3, 4, and 7, are arms, one upon each end of and projecting backward from the carriage; $I^2$, links, one end of which is pivoted to end of arm $H^2$ and the other end to the sides $J^2$ of a frame, the bottom $K^2$ of which extends along under the platen D and from one end of this platen to the other.

$L^2$ are springs, one end of which is pivoted to the upper ends of the sides $J^2$ of the frame by screws or otherwise and which extends forward and rests in grooves or notches $M^2$ which are formed in the platen-frame $E^2$ and preferably directly over the bearing of the platen-shaft $B^2$. These springs bearing upon the platen-frame $E^2$ hold the frame $J^2$ $K^2$ in place and also hold the platen and its connected parts in place on the carriage. By lifting the forward ends of these springs clear of the platen-frame and by then moving them to one side the platen and its connected parts may be lifted from the carriage. The bottom $K^2$ of the frame $J^2$ $K^2$ is adapted to always engage the pins $F^2$, which project downward from the platen-frame $E^2$.

$N^2$ are levers pivoted to frame $A^2$ at $P^2$ and joined together at their front ends by a bar $O^2$, Fig. 2. $R^2$ is an arm extending downward from one of these levers or from a bar $S^2$, joining them near their rear ends; $U^2$, an arm extending upward from one of the key-levers $C'$, which is adapted to control this part of the machine.

When it is desired to use one of the upper-case or capital letters, the key attached to the lever which operates arm $U^2$ is depressed and throws arm $U^2$ in, which engages and throws arm $R^2$ in, raising levers $N^2$, the cross-bar $O^2$ of which engages cross-bar $K^2$ of frame $J^2$ $K^2$, which engages pins $F^2$, raising them and the platen, platen-frame, and connected parts, as shown in Fig. 4, bringing the center of the platen directly opposite the upper letter on the type-bolt. When the operating-key is released, the parts all fall and take their normal positions.

If it is desired to use the upper-case letters for some time, a latch $A^3$, the sides of which are pivoted to the carriage F at $B^3$ and which are furnished with notches $E^3$, which engage the lower side $K^2$ of the frame $K^2$ $J^2$, is released and falls, touching the sides $K^2$ of frame $J^2$ $K^2$, as shown in Fig. 3. When the frame $J^2$ $K^2$ is raised, the notches $E^3$ engage the under side of the part $K^2$ of the frame and hold this frame and the platen in their raised positions, as shown in Fig. 4.

$F^3$ is a bar joining the lower ends of the latches $A^3$; $G^3$, an arm or finger which is carried by one of the key-levers C' and which is adapted, when its key and lever are depressed, to strike against bar F³ and knock the latches A³ clear of the frame J² K², which then falls, and with it the platen and its connected parts, to their first or normal positions. The latch A³ is normally held out of action by a spring H³, attached to its upper part and which engages a pin I³, carried by the side of the carriage F and which can be thrown into or out of operation by the finger. In the drawings the latch is shown as ready to engage the part K² of the frame J² K².

The paper-roll E is held in slotted bearings J³ in brackets K³, which are carried by the platen-frame E². A spring L³, Fig. 5, one upon each bracket K³, always tends to raise the shaft of the paper-roll and cause this roll to bear firmly against the platen or against the paper, which may be placed between this roll and platen.

M³ are the paper-guides, which are placed upon the front of the platen, one near each end thereof. These guides are formed of flat springs. Their lower ends are secured to the brackets K³ by a screw N³, Figs. 4 and 5. Their upper ends are secured together by a rod O³, and a paper-holder P³ is secured to them and extends from one to the other and touches or nearly touches the platen its entire length.

The ribbon-spools A⁴ are carried upon the upper ends of vertical shafts B⁴, which are carried by the main frame of the machine.

It is essential that the ribbon pass very close to the platen on account of the nearness of the type to the platen, and also that the ribbon be held very tight all the time. For these purposes I have furnished the ribbon-guides which are illustrated in Figs. 1 and 14.

C⁴ are brackets which are carried by the shafts B⁴ and which may be firmly clamped to these shafts by the set-screws D⁴.

E⁴ F⁴ are guides carried by brackets C⁴ and which almost meet at their outer ends. The guide E⁴ is adapted to guide the ribbon when the spool is full, or nearly so, and the guide F⁴ when it is empty, or nearly so. The ribbon is indicated by dotted lines in Fig. 14, from which the action of the guides will be fully understood.

The type-levers C' are returned to their first or normal positions by means of a spring S⁶, Fig. 2, one end of which is secured to these levers and the other of which bears against the upper part of the frame A, as shown.

I have not shown in the drawings any means for turning the platen or for operating the carriage. Any of the well-known movements for these purposes may be used.

Having thus described my invention, I claim—

1. The combination of the type-wheel, the slots in the same adapted to receive the shanks of the type-bolts, a groove upon the periphery of said wheel reaching down to said slots, the type-bolts, notches upon the upper ends of the shanks of the same, a spring one end adapted to bear against the forward end of said notch in said bolts and the other against the rear side of said groove in said wheel, and a band adapted to close the top of said groove and means for securing said band to said wheel.

2. The combination with the type-wheel and means for supporting and for rocking the same upon its axis, of segmental racks carried by said type-wheel, dogs for engaging said racks, and mechanism for advancing said dogs when the type-wheel is operated and for returning these dogs when the type-wheel returns to its normal position.

3. In a type-writing machine, in combination, a frame, the keys and key-levers, a rod or pivot upon which the rear ends of said key-levers are pivoted, rods extending across the machine and under said key-levers, springs carried by said key-levers and engaging said frame and operating to support said levers, pivots upon which the outer ends of said rods are pivoted, straps supporting the inner ends of said rods, springs supporting the upper ends of said straps, rods extending upward through and supporting said springs, means for supporting and for lifting said rods, links pivoted to said rods, pins projecting through the upper ends of said links, springs secured to and connecting the upper ends of said links and rods, a type-wheel and means for supporting the same, cups upon said type-wheel adapted to be engaged by said pins upon said links, and springs for returning said type-wheel to its normal position after having been rocked upon its pivot.

4. In a type-writing machine, in combination, a frame, type-keys and key-levers, a rod or pivot carried by said frame and upon which the rear ends of said key-levers are pivoted, rods extending across and under said key-levers, pivots carried by said frame, or by brackets carried by said frame, to which the outer ends of said rods are pivoted, straps supporting the inner ends of said rods, springs supporting said straps, rods passing through and supporting said springs, an arm on said rods, links pivoted to said arms, a bell-crank pivoted to the frame of the machine and to the outer end of the lower arms of which said links are attached, dogs adapted to be operated in one direction by the movement of said bell-cranks, a bearing carried by the frame in which said dogs are supported, a spring for returning said dogs to their first position when the keys are released, a type-wheel and means for supporting and operating the same, and segmental racks carried by said type-wheel and adapted to be engaged by said dogs, all substantially as and for the purposes set forth.

5. The combination with the type-wheel, the segmental racks carried by said type-wheel, and means for supporting and rocking said wheel, of a dog provided with a groove running lengthwise, a bearing in which said dog is carried, a collar placed upon the rear end of said dog and adapted to slide thereon, a pin passing through said collar and entering said groove, a spring one end of which bears against the forward end of said groove and the other against said pin, and a spring surrounding said dog one end of which bears against the inside end of said bearing and the other against the outside end of said collar, all substantially as and for the purposes set forth.

6. The combination with the keys and key-levers, the rods $a$, $a'$ under the key-levers, and devices as described for supporting these rods, of levers pivoted at one end to the frame of the machine, a rib extending from one lever to the other and adapted to be engaged by said key-levers, a vertical rod or rods pivoted to the forward ends of said levers, a hammer pivoted to the frame of the machine, a crank-arm upon the shank of the hammer to which the upper end of said vertical rod is pivoted, and a spring for raising said levers and their connected parts after they have been depressed by the key-levers.

7. The combination with the platen, its shaft and frame, pins projecting downward from the ends of said frame, the carriage and holes in the ends of said carriage through which said pins pass, and the carriage-carrying frame, of a platen-raising frame the sides of which are pivoted to said carriage and the lower part of which extends along under said carriage and is engaged by the lower ends of pins on said platen-frame, springs one of which is secured to the upper ends of said platen-raising frame and the forward parts of which are adapted to rest upon the top of the platen-frame, levers pivoted at their rear ends to the carriage-carrying frame and the forward ends of which are adapted to engage the lower part of said rising frame, an arm secured to said levers and projecting downward, an arm secured to a key-lever and engaging the lower end of said downwardly-projecting arm, and said key-lever and its operating-key.

8. The combination with the platen and its connected parts, the carriage, the vertically-movable frame, the pins $F^2$ carried by said frame and passing down through corresponding holes in the carriage-frame, and the latch the upper end of which is pivoted to the carriage-frame, of an arm $G^3$, a key-lever to which said arm is attached and a key by means of which said lever and arm may be operated to cause the latter to engage the lower end of said latch, substantially as and for the purposes set forth.

THOMAS H. STACKHOUSE.

Witnesses:
A. H. WINTERSTEEN,
HARRY S. HAGAR.